E. J. RILEY.
Dust-Pan.
No. 225,302. Patented Mar. 9, 1880.
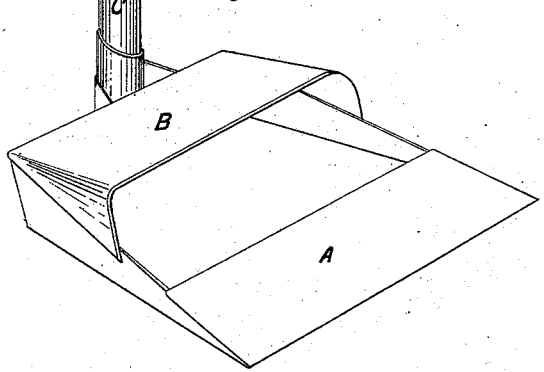
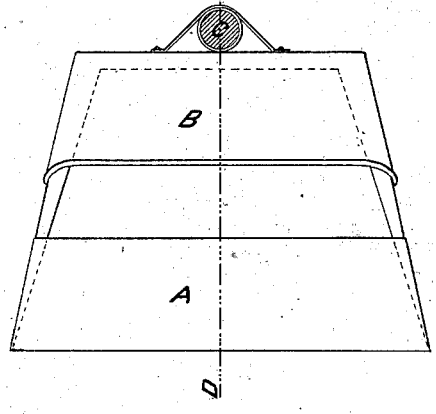
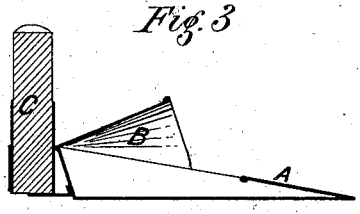
Witnesses
O. L. Petitdidier
Henry Custer
Elizabeth J. Riley
Inventor
by C. S. Jacobs, Atty.

UNITED STATES PATENT OFFICE.

ELIZABETH J. RILEY, OF INDIANAPOLIS, INDIANA.

DUST-PAN.

SPECIFICATION forming part of Letters Patent No. 225,302, dated March 9, 1880.

Application filed February 3, 1880.

*To all whom it may concern:*

Be it known that I, ELIZABETH J. RILEY, of the city of Indianapolis, Marion county, Indiana, have invented a new and useful Improvement in Dust-Pans, which improvement in fully set forth in the following specification and accompanying drawings.

Figure 1 is a perspective view of the dust-pan. Fig. 2 is a plan of the same, and Fig. 3 is a longitudinal section through the dotted line D E, Fig. 2.

My invention consists in the use of a cap or cover, A, placed over the outer edge of the lip of an ordinary dust-pan, and securely fastened over the edge of each side, or to the sides, in any suitable manner. The dust-cover B at the rear of the pan I make larger than in the ordinary pan, and all the joints are made water-tight, as before using the pan it is partly filled with water, the moisture and evaporation causing the dust to settle, and it is retained in the pan.

In connection with the pan I use a long handle, C, which stands at right angles to the pan, and is attached to the rear of the pan, as shown in the drawings.

One or more openings may be made in the rear or sides of the pan for emptying it, which may be plugged up or covered with a screw-cap when the pan is in use.

What I claim, and desire to secure by Letters Patent, is—

1. A dust-pan having a cap or cover fitted over the lower part of the lip, the whole made water-tight, for the purposes described.

2. The combination of the cap A, dust-cover B, and long handle C with a dust-pan, as and for the purpose specified.

ELIZABETH J. RILEY.

Witnesses:
S. W. CANTWELL,
W. L. TAYLOR.